May 27, 1958     D. A. KORMAN     2,836,096
HEMOGLOBINOMETER
Filed April 15, 1953     2 Sheets—Sheet 1
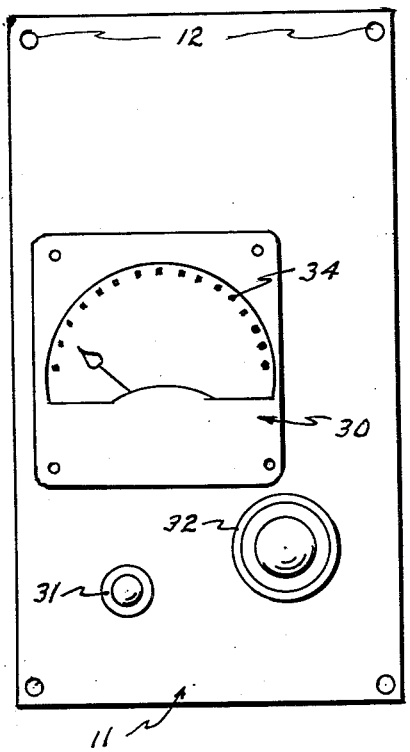
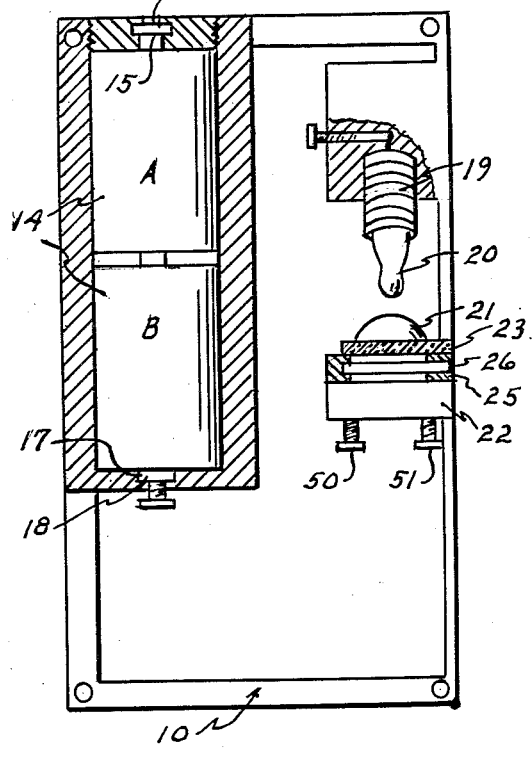
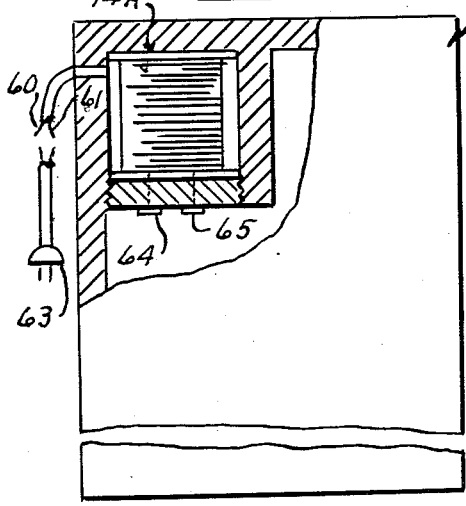
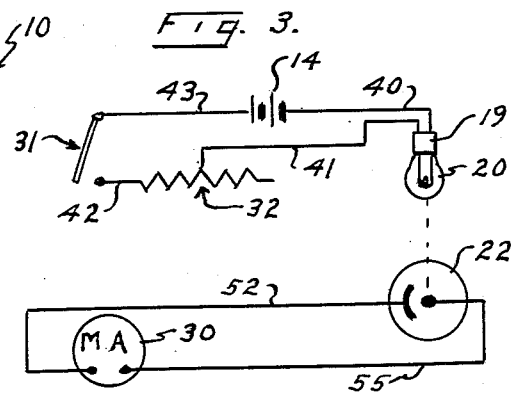
INVENTOR.
DAVID A. KORMAN
BY Howard T. Jenishen
ATTORNEY May 27, 1958  D. A. KORMAN  2,836,096
HEMOGLOBINOMETER
Filed April 15, 1953  2 Sheets-Sheet 2
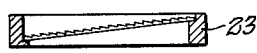
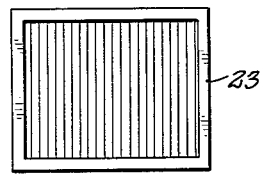
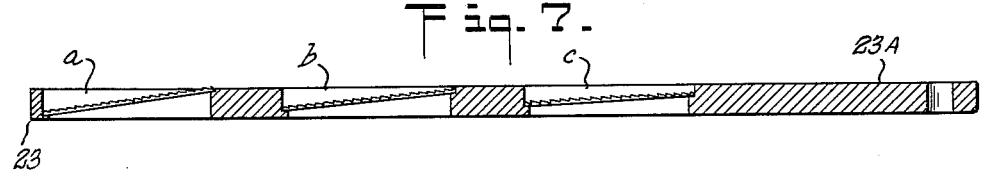
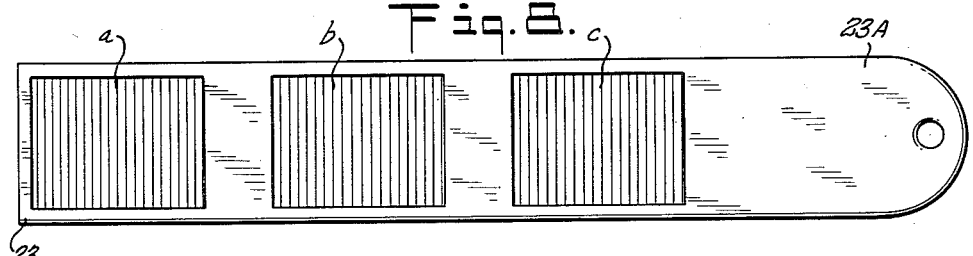
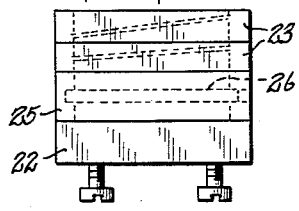
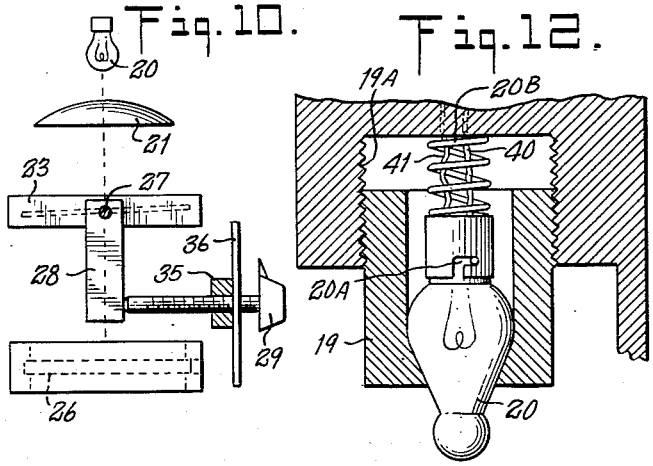
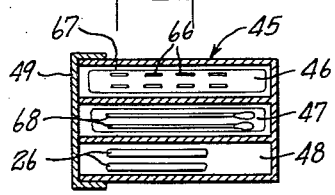
INVENTOR.
DAVID A. KORMAN
BY
Howard T. Jeandron
ATTORNEY United States Patent Office 2,836,096
Patented May 27, 1958

2,836,096

HEMOGLOBINOMETER

David A. Korman, Forest Hills, N. Y.

Application April 15, 1953, Serial No. 348,943

4 Claims. (Cl. 88—14)

This invention relates to an instrument which is carried by a physician for use in making routine examination of the hemoglobin value or content of the blood.

The present invention is designed for use in estimating the quantity of hemoglobin in the blood with the apparatus in which a light may be projected through the specimen of blood and in which the light passing through the specimen is received by a selenium cell (photo-electric cell) in circuit with a suitable registering instrument and in which a hemoglobin scale is provided for a direct reading of the hemoglobin value.

It is an object of this invention is to provide a compact portable device that may be used by the physician for quickly and accurately determining or testing the hemoglobin content of the blood.

It is a further object of this invention to provide an instrument for determining the hemoglobin content of the blood that is simple to manipulate and practical and efficient to a high degree.

A further object of this invention is to provide a means to direct a light beam from an integral power supply through a blood sample and control the amount of illumination impinged upon and passing through a blood sample.

A further object of this invention is to provide a plurality of different types of radiation elements such as a light bulb to be used in determining the hemoglobin content of a blood sample.

A still further object of this invention is to provide a single fixed type diffraction grating that will produce a predetermined light band width for examining the hemogolbin content of blood.

A further object of this invention is to provide a plurality of single fixed type gratings that will produce different light band widths for examining the hemoglobin content of blood.

A still further object of this invention is to provide a single adjustable diffraction grating with means to position said grating at any one of a plurality of known positions to produce a desired light band width for checking the hemoglobin content of a blood sample.

A still further object of this invention is to provide the means of checking the hemoglobin content of different types of blood, more specifically, blood having different types of hemoglobin content.

A further object of this invention is to provide the means for holding a blood sample in proper orientation at a fixed aperture to permit the selection of a predetermined light band width or selectable wave length region of the light spectrum to be directed through the blood sample to produce a desired radiant energy through the blood sample to impinge upon a meter to thus determine the exact hemoglobin content of the blood sample.

A further object of this invention is to provide means to utilize the optimum spectral region of a light source for a particular check of the hemoglobin content of a blood sample.

A further object of this invention is to provide in a hemoglobinometer different types of radiant energy to provide the means of checking various blood samples having different hemoglobin types.

Other objects and advantages of the invention will be apparent in the following detailed description taken in conjunction with the accompanying drawings in which Fig. 1 is a front elevational view of the instrument, Fig. 2 is a front elevational view with the front cover removed, Fig. 3 is a wiring diagram, Fig. 4 is an elevational view partly in cross section of a further embodiment, Fig. 5 is a cross sectional view illustrating a fixed single type diffraction grating, Fig. 6 is a plan view of the diffraction grating in Fig. 5, Fig. 7 is a cross sectional view illustrating a slide holding multiple fixed type diffraction gratings, Fig. 8 is a plan view of the slide illustrated in Fig. 7, Fig. 9 is a further embodiment illustrating a multiple fixed single type diffraction grating mounted in the same relation as illustrated in Fig. 2, Fig. 10 is a still further embodiment illustrating an adjustable diffraction grating mounted between the same elements provided in Fig. 2, Fig. 11 illustrates in cross section a container having three storage cells and a removable cover, and Fig. 12 is an enlarged cross sectional view of the lamp mounting.

In this invention there is provided a carrying case or body 10 in which the components are mounted in compact relationship. The case or body 10 may be constructed of wood, metal or plastic as desired. A cover 11 is provided and this may be affixed to the case 10 by screws 12 or any fastening means to insure a tight compact relationship when assembled. Within the case 10 there are mounted a pair of dry cells 14 so mounted that the positive terminal of one will be in contact with the case or negative terminal of the adjacent cell. Thus both dry cells are connected to provide the electrical energy stored in both cells for use by the device. The cells are so mounted that the positive terminal 15 of one cell will be in contact with a plate 16 while the negative terminal 17 of the opposite cell will be in contact with a plate 18. A small socket 19 is mounted within the case 10 and a bulb 20 fastened within the socket 19. Socket 19 may be threadably secured to a socket 19A in the casing. The bulb 20 may be electrically connected by a socket 20A, socket 20A being connected to a power source that will be described in more detail.

Socket 20A is also maintained in a pressed set position by a spring 20B. With this mounting it is easy to change the bulb 20. In the various applications of this device it may be necessary to change bulb 20 as the bulb used will vary for the particular type of sample being tested and may also vary according to the doctors own opinion or theory of the best form of light or energy to be utilized. In the first place the doctor or physician must consider whether he is testing or checking the hemoglobin content of a normal hemoglobin, or one of the various other hemoglobin forms such as oxyhemoglobin, methyhemoglobin, or sickle cell hemoglobin. In the second place the physician must select the type of bulb 20 he prefers for each test:

(1) Whether it be a normal light bulb 20 giving the complete optical range of the spectrum.

(2) A bulb 20 giving only the visible region of the spectrum.

(3) A bulb 20 giving only the red region of the spectrum.

(4) A bulb 20 giving only the infra-red region of the spectrum.

(5) A bulb 20 giving only a radiant energy that is not in the light spectrum. A lens 21 is positioned in direct focus with bulb 20 and mounted in a permanent relationship within the case 10. A transistor, selenium cell (or any other type of photoelectric detector) 22 is mounted in the case 10 and spaced slightly apart from the lens 21. A diffraction grating 23 is positioned adjacent to the lens 21 on the side toward the selenium cell 22. There is provided a narrow spacing between the selenium cell 22 and the diffraction grating 23. Into this narrow space a tube holder 25 may be mounted by passing through an aperture in the case 10. The tube holder 25 is of a special design to retain a small capillary tube 26 of the shape indicated within the tube holder 25 or of any appropriate shape to fit into the tube holder 25. Referring to Fig. 1 the cover 11 supports a microammeter 30, a switch 31 and a variable resistance 32. The microammeter is provided with a special scale 34 marked thereon. This scale is computed on the hemoglobin content of blood and is similar in its graduated markings to standards used for comparative tests.

Referring to Figures 2 and 3 there is indicated a wiring diagram in which the batteries 14A and B are electrically connected with the positive terminal 15 connected to the plate 16 and the negative terminal 17 connected to the plate 18. Plate 16 is connected by a wire 40 to the base of the socket 19 while the side of the socket 19 is connected by a wire 41 to the one side of the variable resistance 32. The opposite side of the variable resistance 32 is connected by a wire 42 to the one side of the switch 31. The opposite side of switch 31 is connected by a wire 43 to the plate 18. Thus it is apparent that when switch 31 is closed, a circuit will pass from the B battery through wire 43 through the switch 31, wire 42 through variable resistance 32 through wire 41 to the socket 19 through bulb 20 through wire 40 back to the battery A thus illuminating the bulb 20. The variable resistance 32 is provided so that the intensity of the light in bulb 20 may be regulated. This is necessary as the light must in its full intensity record a full deflection by the needle on the microammeter. If the reading is greater than 100%, the variable resistance must be regulated until the needle records full deflection on the dial. If the reading is less than 100%, the variable resistance must be regulated until the needle records full deflection. The selenium cell 22 (Fig. 2) is provided with a pair of terminals 50 and 51. Terminal 50 is connected by a wire 52 (Fig. 3) to a terminal 53 of the microammeter. The opposite terminal 54 of the microammeter is connected by means of a wire 55 to the terminal 51 of the selenium cell. Thus the instrument is complete in its components and when adjusted is ready for a direct reading of the hemoglobin content of any blood sample. The use of a diffraction grating permits the selection of a particular band width of the optical or light spectrum. Figs. 5 and 6 illustrate one example, the diffraction grating 23 may be formed as a slide to be slipped into position as illustrated in Fig. 2. Likewise the kit may be provided with a plurality of diffraction gratings all of different spectrum band width, permitting the physician a choice or a plurality of checks. The radiant energy utilized is understood to vary from 200 millimicrons to 1000 or from 2000 angstroms to 10,000. This of course includes the ultra violet range, the visual range and the red and infra red region. The diffraction grating utilized with any particular radiant energy such as the normal visual light source permits the choice of a narrow band of the optical spectrum which may be in the green region of the spectrum if so desired. Likewise with a red or infra red radiant energy, the diffraction grating permits a narrow choice of a particular band of the radiant energy supplied. In another form or embodiment, the slide 23A, Figs. 7 and 8 is in the form of a single elongated slide with a plurality of diffraction gratings 23 mounted in adjacent relationship along the slide. Of course each grating is preset to obtain a different spectrum band width. For example, referring to Fig. 7, the first diffraction grating "a" may provide a spectrum band that is preferable for the examination of a normal hemoglobin. The next diffraction grating "b" may provide a different band width that is better suited for the examination of an oxyhemoglobin sample; while the next diffraction grating "c" will provide a still different band width which may be better suited for the examination of a methyhemoglobin sample.

In Figs. 5, 6, 7 and 8 there is illustrated the fixed single type diffraction grating. Since each particular diffraction grating used will break up the light beam into a particular band width, it is also acceptable in some instances to combine two or more diffraction gratings in parallel relationship as illustrated in Fig. 9. It is apparent in Fig. 9, that two gratings 23 are positioned between the optical beam and the hemoglobin sample contained in element 26 with the selenium cell 22 positioned on the opposite side of the sample 26 to provide the necessary reading or check of the hemoglobin content of the sample being tested. This combination of diffraction gratings permits a wide choice of optimum wave lengths coinciding with the type of hemoglobin to be measured.

Referring to Fig. 10 there is illustrated a still further embodiment of this invention in which a single diffraction grating 23 is mounted between the light directing lens 21 and the blood sample contained in element 26. In this embodiment, the diffraction grating 23 is pivotally supported by the pivots 27 and the diffraction grating 23 is provided with an extended arm 28 at one side thereof and the grating 23 is illustrated in its normal level position. A threaded element 29 threadably secured to a supporting means 35 extends through the means 35 and bears against the lower end of the arm 28. It is apparent that the adjustment of element 29 will move arm 28 away from its central axis and thus tip the diffraction grating 23 from the level horizontal position illustrated. The degree or angle that the grating 23 is moved may be calculated, that is, the width of the optical band produced by the variation in the angle of grating 23 from the horizontal may be calibrated and marked on a scale 36. The scale 36 will of course be mounted on element 35 in a stationary position. Thus with a pointer or marking on the head of element 29, it is easy to determine the width of the band that may be obtained through the diffraction grating 23 by simply referring to the dial 36. With this type of mechanical means for rotating the grating, a single diffraction grating 23 permits a wide choice of band widths for various types of hemoglobin test check.

A feature of the hemoglobinometer is the provision of a container 45 (Fig. 11) which may be carried separately or may be mounted within the casing 10. The container 45 is constructed to be fluid tight and provided with a fluid sealing cover 49. The container 45 is divided into three separate storage cells 46, 47 and 48. The container 45 is normally filled with a sterilizing solution to permit the storage of the accessories that are to be utilized with the hemoglobinometer. For example a quantity of surgical lancing needles 66 may be stored in cell 46 of the container 45. To insure an easy method of handling these needles, the needles 66 are illustrated as affixed or contained between sheets of cellophane 67. In use it is a simple matter to remove the cover 49 pull the cellophane 67 out and tear a portion of the cellophane enclosing one or more needles 66 so that they may be used for lancing to obtain a blood sample. Also stored within the container 45 are a plurality of swab sticks 68 stored in cell 47. The swab sticks may be stored separately or they may be similarly affixed to a sheet of cellophane and by tearing the cellophane one or more swabs may be obtained to sterilize the skin for each puncture by the surgical lancing needle. In cell 48 of the container 45 there may be stored a plurality of the blood sample tubes 26. These tubes will probably be stored loosely in cell 48 in the sterile solution. In the use of the complete device as described above, the physician will first open container 45 to obtain a surgical lancing needle 66 and a swab 68. Using the swab 68 the physician will sterilize a portion of the skin of the patient and by means of the needle 66 will puncture the epidermus of the patient and obtain a blood sample. The physician may then remove one of the blood sample tubes 26 from the container 45 and introduce the blood sample from the needle into tube 26. Tube 26 is then ready to be inserted into the hemoglobinometer in the position illustrated in Fig. 2 by placing the tube 26 in the tube holder 25. The instrument must first be adjusted as described above, as soon as switch 31 is closed there will be a direct and exact reading on the hemoglobin scale 34. When the test has been completed, the capillary tube 26 is removed and destroyed as of no more value. Referring to Fig. 4 there is illustrated a similar case 10 to that illustrated in Figs. 1 and 2 but in this embodiment instead of inserting a pair of batteries there is provided a small transformer 14A. The transformer on one side is connected by means of a pair of wires 60 and 61 to a plug 63 so that the transformer 14A may be readily plugged into a 110 volt source of alternating current. In this embodiment, the transformer 14A is provided with a pair of low potential terminals 64 and 65. It is apparent that with this embodiment the transformer will be inserted in the wiring diagram of Fig. 3 in place of the battery 14 and thus line 40 would be connected to terminal 64 while line 43 would be connected to terminal 65. Although there is shown the transformer 14A as mounted within the case 10, in a further embodiment the transformer 14A may be carried as a separate unit and in such case the transformer is simply plugged into the position illustrated in Fig. 4 so that the contacts of the terminals 64 and 65 are similarly made. A further embodiment of this invention is not illustrated but is simply the combination of both Figs. 2 and 4 in which both the batteries 14 and a transformer 14A may be supplied so that the physician or operator may use either the battery or the transformer according to his preference.

It is apparent that the instrument is so simple in use and yet so efficient and so rapid in its exact calculation that it is of the utmost value to the physician and is not dependent upon any human factor for comparative results. This instrument may be modified or may be applied as a colorimeter or any similar use without departing from the spirit of this invention and this invention shall be limited only by the appended claims.

What is claimed is:

1. A hemoglobinometer comprising a casing, a light source that includes the complete light spectrum within the casing, a specimen holder mounted adjacent to said light source, a plurality of diffraction gratings mounted in adjacent relationship along a slide so that any one of the gratings may be positioned between the light source and the selenium cell, a lens mounted between said light source and said specimen holder, and cooperating with one of the diffraction gratings, said diffraction grating designed to allow the radiant energy from said light source to pass through said grating to form a wave band in a predetermined portion of the light spectrum, a selenium cell mounted adjacent to said specimen holder, a battery mounted in said casing, a cover for said casing, a microammeter with a hemoglobin scale mounted in said cover, a variable resistance and a switch also mounted in said cover, means to connect the light source to said battery and said battery to said switch and said switch to said variable resistance and said variable resistance to said light source to permit adjusting the intensity of said light source, means to connect the terminals of said selenium cell to the terminals of said microammeter to produce a reading on said microammeter when said selenium cell is energized by a light beam.

2. In a device according to claim 1, in which each of the diffractiong ratings covers a different portion of the complete light spectrum.

3. A hemoglobinometer comprising a casing to retain all components, a radiant energy source that is within the light spectrum within the casing, a specimen holder within the casing mounted adjacent to said radiant energy, a diffraction grating for each division of the light spectrum and each grating retained in its normal spectrum relationship to cooperate with said radiant energy source, an aperture in said casing adjacent to said specimen holder to permit inserting a capillary tube containing a blood specimen into said specimen holder, a lens and said diffraction grating mounted between said light source and said specimen holder, said diffraction grating designed to allow said radiant energy to pass through said grating into a plurality of wave bands, each a predetermined portion of the light spectrum, a selenium cell mounted in said casing on an opposite side of said specimen holder to said radiant energy source, said radiant energy source connected to a battery, a switch and a variable resistance to permit regulating the intensity of said light source, a microammeter with a hemoglobin scale mounted on said casing and connected to said selenium cell.

4. In a device according to claim 3 in which an infra red radiant energy source is mounted in a predetermined position and a diffraction grating that includes the infra red is utilized to divide the spectrum into a plurality of separate bands, said grating is positioned to pass the infra red light spectrum.

References Cited in the file of this patent
UNITED STATES PATENTS

| | | |
|---|---|---|
| 1,938,544 | Schoeberg | Dec. 5, 1933 |
| 1,978,096 | White | Oct. 23, 1934 |
| 2,051,320 | States | Aug. 18, 1936 |
| 2,287,322 | Nelson | June 23, 1942 |
| 2,339,053 | Coleman | Jan. 11, 1944 |
| 2,396,260 | Gradisar et al. | Mar. 12, 1946 |
| 2,463,280 | Kaehni et al. | Mar. 1, 1949 |
| 2,481,567 | Brown | Sept. 13, 1949 |
| 2,640,389 | Liston | June 2, 1953 |

OTHER REFERENCES

Andrews: "Review of Scientific Instruments," "A Simplified Colorimeter for Blood Analysis," vol. 16, #6, pages 148–152, June 1945.